United States Patent [19]

Chou

[11] Patent Number: 5,234,054
[45] Date of Patent: Aug. 10, 1993

[54] METHOD FOR FOAM EMPLACEMENT IN GAS FLOODING FOR ENHANCED OIL RECOVERY

[75] Inventor: Shang Chou, Anaheim, Calif.

[73] Assignee: Chevron Research and Technology Company, San Francisco, Calif.

[21] Appl. No.: 758,040

[22] Filed: Sep. 12, 1991

[51] Int. Cl.⁵ .................... E21B 33/138; E21B 43/22; E21B 43/24

[52] U.S. Cl. .................... 166/272; 166/273; 166/274; 166/294; 166/309

[58] Field of Search ............... 166/268, 272, 273, 274, 166/294, 309

[56] References Cited

U.S. PATENT DOCUMENTS

| | | | |
|---|---|---|---|
| 4,597,442 | 7/1986 | Dilgren et al. | 166/274 X |
| 4,617,995 | 10/1986 | Lau | 166/274 X |
| 4,706,752 | 11/1987 | Holm | 166/273 |
| 4,852,653 | 8/1989 | Borchardt | 166/274 X |
| 5,052,487 | 10/1991 | Wall | 166/274 |
| 5,086,840 | 2/1992 | Soucemarianadin et al. | 166/294 |

Primary Examiner—George A. Suchfield
Attorney, Agent, or Firm—W. K. Turner; M. W. Carson

[57] ABSTRACT

A method for improving the sweep efficiency of gas or steam flooding operations by reducing the permeability of relatively high permeability thief zones of an oil bearing subterranean reservoir having heterogeneous and/or fracture permeability and that is penetrated by at least one well is disclosed. A controlled quantity of a surfactant is injected into a high-permeability zone of a reservoir. Controlled quantities of a gas and a subsequent surfactant are then injected, simultaneously or alternatively into the same well, so that a controlled amount of foam having a controlled quality is generated in the high permeability zone, thereby reducing permeability. Following foam emplacement, a chase gas may be injected, and the steps of injecting surfactant and gas may be repeated as necessary to lower the gas-oil ration of non-problem offset producing wells to a preset limit.

9 Claims, No Drawings

METHOD FOR FOAM EMPLACEMENT IN GAS FLOODING FOR ENHANCED OIL RECOVERY

BACKGROUND OF THE INVENTION

This invention relates to the recovery of oil from subterranean reservoirs and more particularly concerns an improved process for recovering oil from porous reservoirs having heterogeneous permeability, utilizing the injection of fluids and gases.

Significant quantities of crude oil exist in underground formations. These substantial amounts remain even after completion of primary recovery operations. Because of this, techniques have been developed for stimulating production from such reservoirs. Such methods include water flooding, gas flooding and steam injections, but none to date have been very successful. One variation of gas and steam flooding is foam injection. The objective is to improve the sweep efficiency of gas and steam in the reservoir. However, this method has been largely unsuccessful because of an incorrect sequence of fluid injections, improper selection of reservoirs for treatment, and the incorrect timing to initiate foam injection Generally, water flooding is ineffective for displacing the oil, because of the high oil-water interfacial tension and the rich viscosity of the oil. Steam injection lowers the viscosity of the oil, but requires the availability of inexpensive fuel and a large supply of clean water. A variation on steam injection is known as the huff-and-puff method, which is disclosed by West in U.S. Pat. No. 3,782,470. In huff-and-puff steam injection, the well is used for alternate injection of steam and production of reservoir fluids. In a recent variation of the huff-and-puff method, immediately following the injection phase of steam, which lowers the viscosity of the oil, a non-condensing, nonoxidizing gas is injected at ambient temperature. The gas displaces the low viscosity oil and improves production rates, reduces the amount of steam required, and improves the oil-water ratio of the well. However, where a multi-component gas is employed, such as natural gas, the higher molecular weight hydrocarbons tend to condense as the formation cools following steam injections. The condensed hydrocarbons have high solubility and even miscibility with most crudes. As a result, crude oil may be miscibly displaced from the vicinity of the wellbore, resulting in reduced permeability of oil at the wellbore.

The areal sweep efficiency of carbon-dioxide recovery is increased by generating a foam in situ to block the highly permeable features of the underground formation. U.S. Pat. No. 3,342,256, issued to Bernard et al., discloses alternative methods for generating foam in situ to prevent channeling of carbon dioxide into high permeability channels away from the zone to be treated. In one embodiment, a small amount of a surfactant or foaming agent is dissolved in the carbon dioxide, which is maintained as a dense fluid or liquid at pressures in excess of about 700 psig to ensure solubility. A subsequently injected drive medium, such as water, forces the carbon dioxide-surfactant mixture through the formation to a production well where production continues until the produced fluids exhibit an undesirably high water/oil ratio. Production is then terminated, and the formation is depressurized to allow dissolved gases to come out of solution and form the foam. As the foam expands, it drives additional oil towards the producing well.

Relying upon gases released in low pressure zones to generate the foam, however, presents certain disadvantages. When the foaming agent is dissolved directly into carbon dioxide or into carbonated water, a large portion of the gaseous carbon dioxide released in the low pressure zone does not go to generating foam, but is preferentially absorbed into the crude. And if the released carbon dioxide migrates into a high pressure region, solubility of carbon dioxide is increased and may approach miscibility at pressures in excess of about 700 psig. These difficulties are not encountered if the foaming agent is dissolved in a hydrocarbon vehicle, but the cost of liquid hydrocarbons is generally prohibitive. Moreover, a hydrocarbon-soluble surface-active agent generally emulsifies the oil and restricts its movement through the reservoir. The upshot is that increasing the areal sweep efficiency of the recovery method by generating foam in situ is much more difficult and expensive in the reservoir than laboratory results might otherwise indicate.

A method of gas injection is disclosed by Holm in U.S. Pat. No. 4,706,752 (which is hereby incorporated by reference). This method discloses the use of a water-soluble surface active agent, and then a gas mixture of carbon dioxide and a noncondensable, nonhydrocarbon gas which is insoluble in viscous crude. A foam forms in-situ which is used for blocking the escape of solvent fluids into higher permeability zones of the reservoir during enhanced recovery. Holm's method is not concerned with the actual process of emplacing the foam. Holm does not saturate the formation with a calculated volume of surfactant, to ensure that foam can be generated and to produce more stable foam. Holm merely modifies the "foam drive process" of displacing oil, and does not even recognize the need to emplace the foam at a selected location in the reservoir. Holm is instead primarily concerned with modifying the vertical injection profile of the injector well.

T. M. Jonas et al. (including Applicant) published SPE Paper No. 20468, entitled "Evaluation of a $CO_2$ Foam Field Trial: Rangely Weber Sand Unit" on Sep. 23, 1990. Jonas et al. recognized a problem caused by the existence of thief zones, which are high permeability zones in the selected formation where an injected fluid could escape, rather than be properly emplaced in the desired portion of the formation. The method utilized by Jonas et al. comprised injecting a surfactant slug, followed by injecting a foam, which was followed by injecting a $CO_2$ chase gas.

Jonas et al. never realized the importance of presaturating the reservoir with a surfactant. The authors maintained that the advantage of emplacing foam by displacing a slug of surfactant is in the simplicity of operation and the lowest injection cost of three possible methods. Also, Jonas et al. discussed the disadvantages of injecting a surfactant first, which include low foam resistance and foam stability factors, the lack of control over the process once all the surfactant is injected, and the danger that the gas and liquid may exit from different intervals in the formation.

Jonas et al. did not discuss any calculation of a preferred amount of surfactant to inject, prior to the injection of foam, or even the need to inject a preferred amount of surfactant. There is no discussion of any advantage gained in foam quality by presaturating part of the formation with a surfactant.

The prior work is limited in the attempts at foam emplacement, in that no suitable method has been designed which saturates a productive reservoir with a surfactant, followed by injections of gas and surfactant, in order to plug thief zones in the formation and to generate a foam of enhanced quality. There is therefore a need for such a method for use in producing oil from a reservoir, utilizing the injection of surfactants and gases.

SUMMARY OF THE INVENTION

The present invention is surprisingly successful in providing a method for improving the sweep efficiency of gas or steam floods by reducing the permeability of higher permeability thief zones of an oil bearing subterranean reservoir having heterogeneous and/or fracture permeability that is penetrated by at least one well.

A controlled quantity of a first surfactant is injected into an injector well of the reservoir that has at least one zone of unusually high permeability. Controlled quantities of a gas and a subsequent surfactant are then injected, simultaneously or alternately, into the same well so that a controlled amount of foam of a controlled quality is generated in the high permeability zones, so that the permeability is reduced.

In another embodiment of the present invention, nearly 50% of the total amount of surfactant to be injected is injected as a first surfactant. It is preferred that the surfactants exist in aqueous solutions and have concentrations in a range from 0.3 to 1.0 percent. Following foam emplacement, a chase gas may be injected, and the steps of injecting surfactant and gas may be repeated as necessary to lower the gas-oil ratio of non-problem offset producing wells to a preset limit.

The above and other embodiments, objects, advantages, and features of the invention will become more readily apparent from the following detailed description of the invention.

DETAILED DESCRIPTION OF THE INVENTION

Initially, specific criteria must be fulfilled to aid in the choice of a proper subterranean reservoir for foam emplacement to plug off thief zones. Thief zones are those overly permeable portions of a formation that are known or suspected to allow an injected fluid to escape, rather than remain emplaced in the desired location. In the absence of thief zones, it is highly probable that foam may reduce oil recovery by plugging productive zones. The economics of foam treatment is also more favorable under these circumstances, because the reduction in gas cycling may be sufficient to pay for the cost of foam treatment. Suitable injector wells are typically those wells that have disproportionately high gas production rates in one or two offset producers (herein defined as problem producers), along with a significantly higher injectivity than other wells in the field. Foam should be emplaced when oil is largely depleted in thief zones, because (1) foam stability is reduced by the presence of oil, and (2) the oil present in the thief zone would not be recovered if foam is injected early. The problem producers should have a high gas-oil ratio, at least 10, preferably over 100. Furthermore, the tertiary oil production is presumed to have peaked in the problem producers.

After an appropriate subterranean reservoir is chosen, a controlled quantity of a first surfactant, preferably in the form of a slug, is injected near at least one higher permeability zone. The proximity to the higher permeability zone can be easily calculated by one of ordinary skill in the art of foam treatment. It is preferable that about 50% of the total amount of surfactant used in the process is injected. The surfactant slug acts to presaturate the portion of the subterranean reservoir which is desired to form foam with a surfactant solution therein. The first and subsequent surfactants utilized can be the same throughout the process and they are common and commercially-known and used, such as Chaser CD 1040 ® or CD 1050 ®, manufactured by Chevron Chemical Company. Once a portion of the subterranean reservoir is presaturated with surfactant, the injection of controlled quantities of gas and a second surfactant into the same portion of the reservoir begins. This injection can be either simultaneous or alternate although the latter is preferred. The gas utilized can be $CO_2$, $N_2$, a hydrocarbon gas or a mixture of these gasses. The mixture of a gas and a surfactant is called foam. Simultaneous injection of gas and surfactant may create foam in the tubing as the mixture is injected into the reservoir. Alternate injection only generates foam in the reservoir. In either case, it is the foam in the reservoir rock that improves the sweep efficiency of the gas to be injected after the foam.

The co-injection of a gas and a second surfactant causes a controlled amount of foam of a controlled quality to be generated in the thief zone(s). The permeability of the zone(s) is thereby reduced, and the thief zone(s) is eliminated or at least greatly reduced.

In the preferred embodiment, the first and second surfactants are aqueous solutions that have concentrations in a range from about 0.3 to about 1.0 percent. It is also preferable that the foam that is generated have a foam quality (gas fractional flow) in a range from about 50 to about 80 percent. It is further preferred that the first surfactant be injected in the form of a slug.

In another embodiment, the presaturation of the reservoir with a first surfactant permits the reservoir to be evaluated, to make sure that a fluid can flow into the particular part of the reservoir at a rate such that a foam of a preferred quality can be formed within a reasonable time. Presaturation of the reservoir with a surfactant ensures that a stable foam can be subsequently generated.

Injection of the subsequent surfactant and gas commences when a predetermined volume of first surfactant slug is emplaced. The volume of foam that needs to be generated is determined by reservoir characteristics. If the reservoir is fractured, the fracture half-length (X), in feet and height (H), in feet is calculated from pressure transient tests and reservoir geology. From this, the foam volume is calculated using the following equation:

$$\text{Foam volume } (ft^3) = 6.X.H.\phi$$

Where $\phi$ is rock porsity.

If the reservoir is unfractured, it is necessary to determine the thickness of high-permeability thief zones (H). The foam volume is then calculated using the following equation:

$$\text{Foam volume } (ft^3) = 3000.H.(\phi)$$

While this is the preferred method for determining foam volume, it may be necessary to cease injection of foam if the gas injection rate drops below 10% of the pre-foam injection rate at the same pressure.

Once the preferred volume of foam is emplaced via injection, a chase gas is flowed through the reservoir. The chase gas should be the same as the gas used in the gas flood operation prior to foam injection. The chase gas is injected at a pressure which should not exceed foam injection pressure. The chase gas is injected until the chase gas injectivity reaches the level of gas injection prior to the injection of the foam.

At this time, the injection of surfactant and gas is repeated and the volume of foam is restored to substantially the prior calculated volume. A chase gas is once again injected into the reservoir, and this procedure continues until the gas-oil ratio in the problem offset producers reaches a preset limit of the field.

Simultaneously, with foam emplacement and injection of the chase gas in the reservoir, at least a portion of the remaining petroleum in place and other production fluids in the reservoir are recovered in other nearby reservoirs that are geologically connected to the injection well, from a reservoir engineering standpoint.

Various embodiments and modifications of these inventions have been described in the foregoing description, and further modification will be apparent to those skilled in the art. Such modifications are included within the scope of this invention as defined by the following claims.

What is claimed is:

1. A method for generating foam by improving the sweep efficiency of gas and steam floods by reducing the permeability of higher permeability thief zones of an oil bearing subterranean reservoir having heterogeneous and/or fracture permeability and being penetrated by at least one well, said method comprising:
   (a) injecting a controlled quantity of a first foam-forming surfactant into an injector well of said reservoir having at least one of said higher permeability zones to presaturate said reservoir; and
   (b) co-injecting controlled quantities of a gas and a subsequent foam-forming surfactant into the same injector well of said reservoir so that a controlled amount of foam of a controlled quality is generated in said high permeability zones so that said permeability of said high permeability zones is reduced.

2. The method of claim 1 wherein said controlled quantity of said first surfactant is nearly 50% of the total amount of said surfactant to be injected.

3. The method of claim 1 wherein said first and subsequent surfactants have concentrations in a range from 0.3 to 1.0 percent.

4. The method of claim 1 wherein said generated foam has a foam quality in a range from 50 to 80 percent.

5. The method of claim 1 wherein said controlled quantities of a gas and a second surfactant are injected alternately.

6. The method of claim 1 wherein said first surfactant is injected in the form of a slug.

7. The method of claim 1 wherein said first and said subsequent surfactants are the same.

8. The method of claim 1 wherein said controlled quantities of a gas and a subsequent surfactant are injected simultaneously.

9. The method of claim 1 further comprising the additional step of injecting a chase gas.

* * * * *